R. H. FENN.
CALCULATING DEVICE.
APPLICATION FILED JUNE 16, 1908.

922,465.

Patented May 25, 1909.
3 SHEETS—SHEET 1.

WITNESSES:
Fred White
René Nuine

INVENTOR
Robert H. Fenn,
By Attorneys,
Arthur E. Frasert Uema

R. H. FENN.
CALCULATING DEVICE.
APPLICATION FILED JUNE 16, 1908.
922,465.
Patented May 25, 1909.
3 SHEETS—SHEET 2.
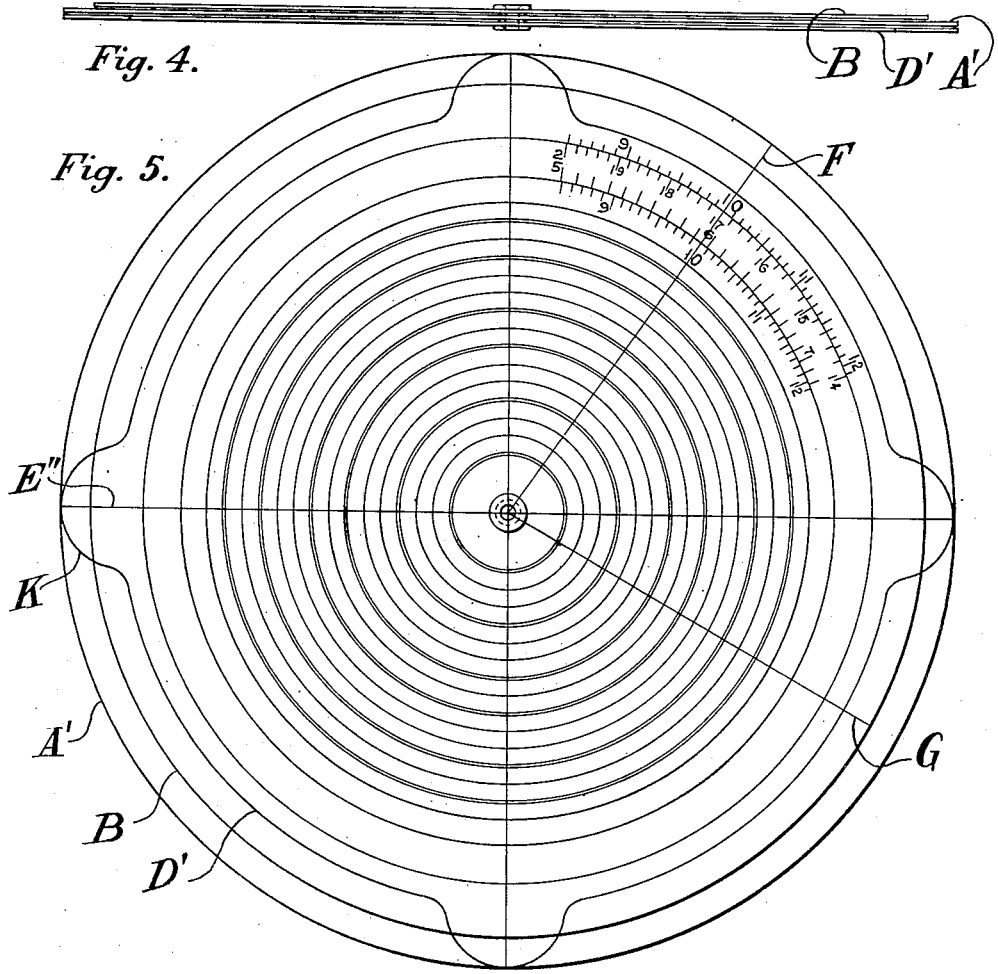
Fig. 4.
Fig. 5.
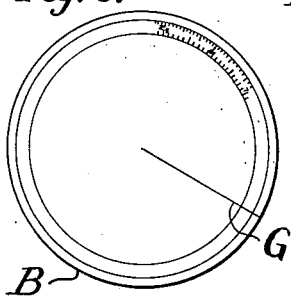
Fig. 6.
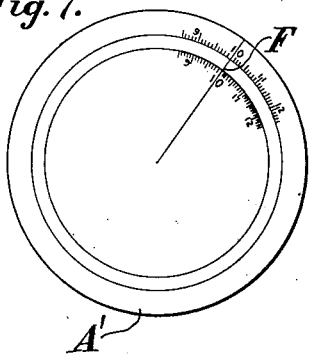
Fig. 7.
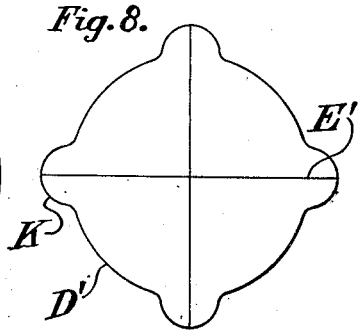
Fig. 8.
WITNESSES:
Fred White
René Bruine
INVENTOR
Robert H. Fenn,
By Attorneys

R. H. FENN.
CALCULATING DEVICE.
APPLICATION FILED JUNE 16, 1908.

922,465.

Patented May 25, 1909.
3 SHEETS—SHEET 3.

WITNESSES:

INVENTOR
Robert H. Fenn,
By Attorneys,

UNITED STATES PATENT OFFICE.

ROBERT H. FENN, OF SUFFERN, NEW YORK.

CALCULATING DEVICE.

No. 922,465.  Specification of Letters Patent.  Patented May 25, 1909.

Application filed June 16, 1908. Serial No. 438,693.

*To all whom it may concern:*

Be it known that I, ROBERT H. FENN, a citizen of the United States, and a resident of Suffern, in the county of Rockland and State of New York, have invented certain new and useful Improvements in Calculating Devices, of which the following is a specification.

My invention aims to provide certain improvements in calculating devices, especially those of a circular form in which a plurality of annular scales are provided on disks or similar members which are in parallel and contiguous planes; and provides a simple and inexpensive construction capable of making accurate and complicated computations with a minimum number of settings of the movable part or parts.

The accompanying drawings illustrate embodiments of the invention.

Figure 1:
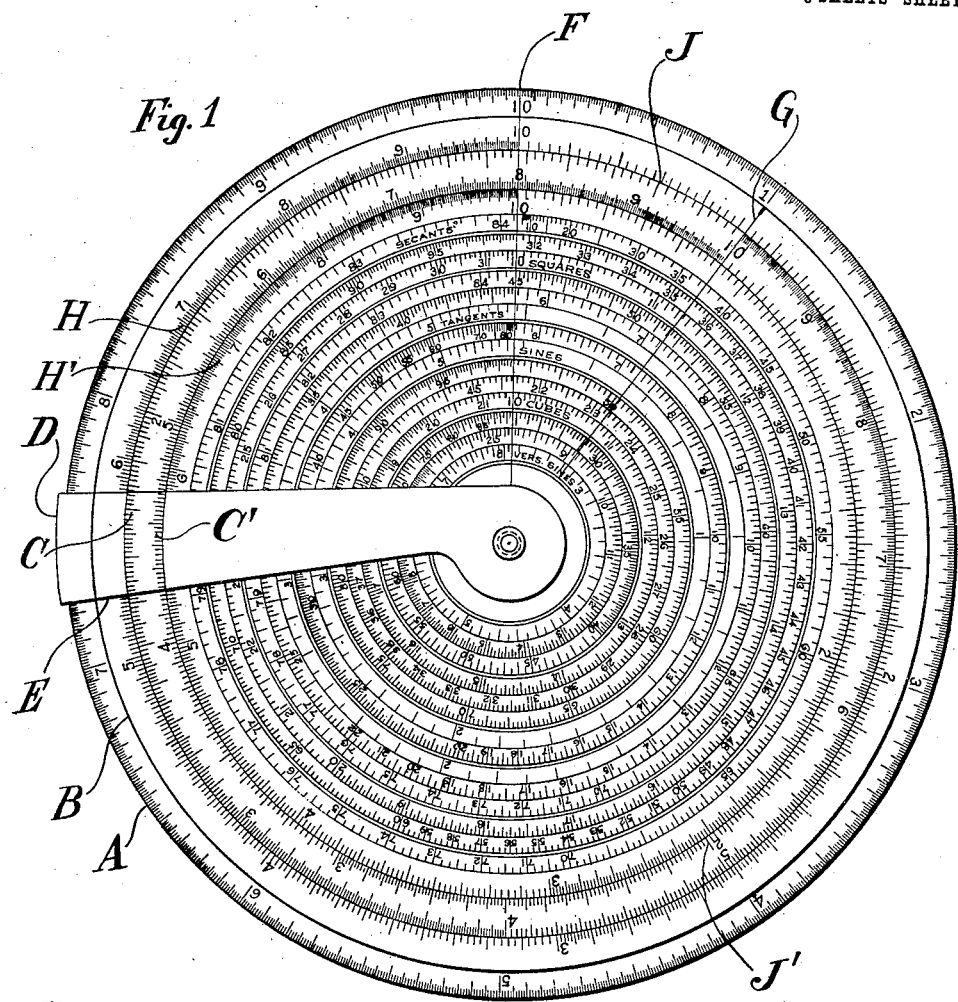
Figure 2:
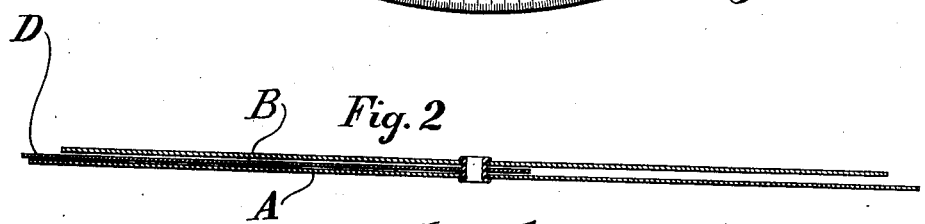
Figure 3:
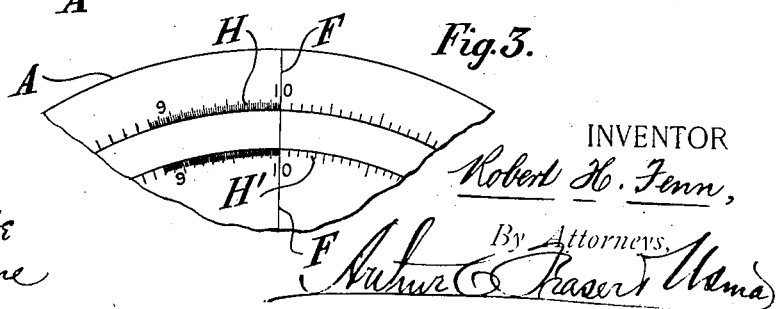
Figure 9:
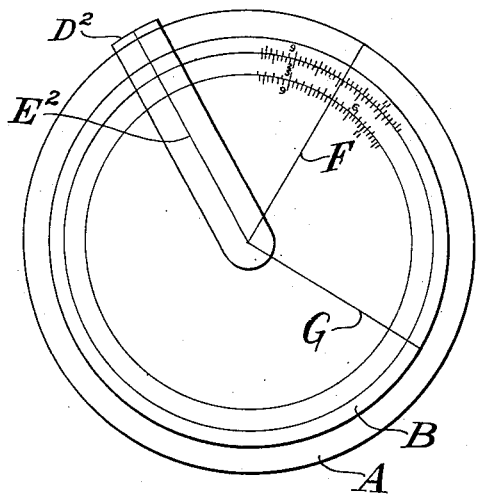
Figure 10:
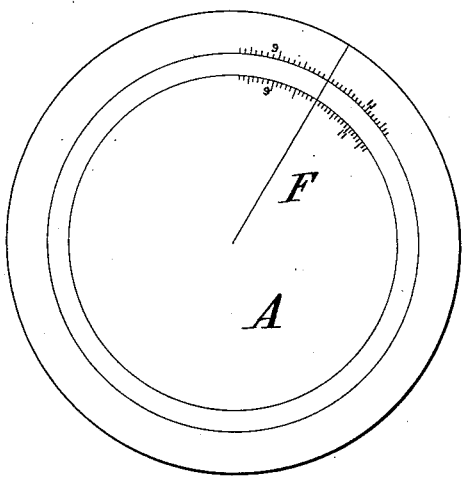
Figure 11:
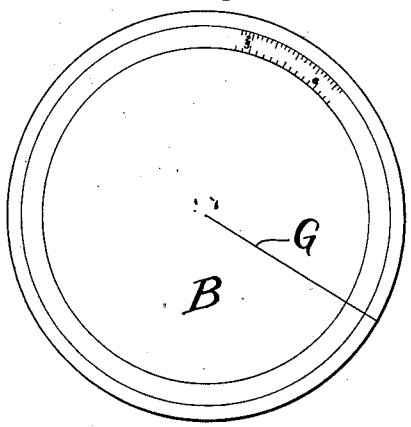
Figure 12:
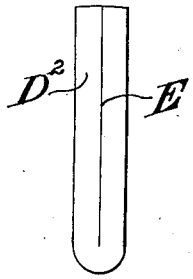
Figure 13:
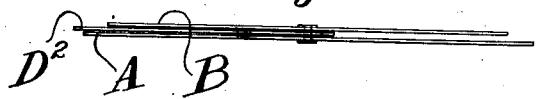

Figure 1 is a face view of the preferred style. Fig. 2 is a diametral cross section thereof. Fig. 3 is a segment of one of the members. Fig. 4 is an edge view of another style. Fig. 5 is a plan of the same. Figs. 6, 7 and 8 are plans of the individual members thereof. Fig. 9 is a plan, still a third style. Figs. 10, 11 and 12 are plans of separate members thereof. Fig. 13 is an edge view thereof.

The scales marked upon the device may be of any suitable or desired sort. For example, the device may be provided with a simple linear scale, logarithmic scales, squares, cubes, roots, natural and logarithmic of functions of angles, such as secants, tangents, sines and versed sines; the scales of versed sines, cubes, sines, tangents, squares and secants being indicated by name on Fig. 1, the logarithmic divisions of simple numbers being indicated by a double line outside of the secants, the regular linear scale being indicated at the edge of the disk.

An important feature of the invention is the provision of two sets of annular scales preferably representing logarithms of successive numbers, each set mounted on a separate disk and consisting of a plurality of annular scales fixed relatively to each other. The two sets of scales are mounted concentrically on disks rotatable one relatively to the other so that each set of scales is movable relatively to the other set. Preferably at least one set is mounted on a transparent disk through which the other set is visible. In the device of Figs. 1 and 2 a lower disk A is used containing the various scales above referred to. The upper disk B is transparent and contains only the double logarithmic scale C C'. An arm or pointer D having one radial edge E is pivoted at the center of the two disks and lies in a plane between them. In Fig. 1 the arm D is illustrated as opaque and therefore hiding the figures upon the main disk which lies beneath it but not, of course, hiding the double scales C C' of the transparent disk above it. Each of the disks A and B has a unit or starting line, that of the lower disk being indicated at F and that of the upper transparent disk at G. The position of the double annular scale H H' is as indicated most clearly in Fig. 3, that is to say, the division lines lie outside of the same circular lines of which the divisions of the scales C C' lie on the inner sides. The scales C C' extend entirely around their disk, as do the scales H H' but the former run one to the left hand and the other to the right hand from their starting point G; while both the scales H H' run in the same direction and are in fact identical (but for the difference due to the lesser radius of the scale H'). The use of such scales enables me to perform a great variety of mathematical operations without the necessity of much manipulation of the disks and in very much less time than the same number of operations could be performed with previous apparatus of this type. For example, two successive multiplications may be performed with one manipulation of the disks.

Suppose it is desired to obtain the product of 1.1 × 1.148 × 2. The division on the scale C corresponding to the number 1.1 is brought in juxtaposition to the point corresponding to 1.148 upon the scale H, this point of juxtaposition being indicated at J, Fig. 1. The starting line G of the upper disk will then overlie the product of these two numbers upon the outer scale H; (this number is 1.26, but if a further multiplication is to be made the number will not need to be noted). Supposing further multiplication by 2 to be desired, the operator uses the inner scale C' and observes that the number 2 thereon is in juxtaposition at J' with the number 2.52 upon the scale H'. Consequently 2.52 is the product of the three numbers in question. If now it is desired to obtain the square root or the cube root of this product, it is only necessary to bring the radial edge E of the arm D under the figure 2 on the scale C' and to read off along this edge the desired figure upon the annular scale of squares. Thus with only one setting of the parts of the apparatus, I have performed the operation which I may represent by $$\sqrt[3]{a} \times b \times c.$$

Various other equally complex operations may be performed at one setting of the device, and in performing any complex operations whatever a great saving of time may always be effected.

The scale-carrying members and the means for indicating a radial line so as to read from the inner scales (squares, cubes and trigonometrical functions) may be considerably varied without departing from the principle of the invention. For example, in the device of Figs. 4 to 8 both the scale-carrying members are made transparent and the radial-line-carrying member is opaque and arranged at the back of two principal members. As in the construction of Fig. 1 the inner set of scales may be carried upon either of the scale-carrying members; but preferably they are carried upon the underneath one so as to be protected from abrasion in the handling of the device. The lower or underneath scale-carrying member A′ is slightly larger than the upper member B which carries the two reversed scales. The radial-line-carrying member D′ is circular and opaque and carries four radial lines E′ so that it need never be turned more than a quadrant in order to bring a radial line into operative position; and is provided with tabs K forming convenient handles. The shape and size of this member D′ adapt it to support and stiffen the members A′ and B so that the latter may be made quite thin and the more transparent. The opaque members are preferably made of stiff card board or celluloid or similar material and the transparent members may be conveniently made of transparent celluloid, oiled paper or the like.

Figs. 9 to 13 inclusive show a construction using an opaque underneath scale carrier A and a transparent upper scale carrier B as in the construction of Fig. 1 and using also a transparent radius carrier D² projecting slightly beyond the circular members so as to be easily accessible and having a radial line E² marked down its center. With this style of radius carrier or with the arrangement of Fig. 5 (both of which it will be observed permit of seeing the scale at both sides of the radial line which is not true with the construction of Fig. 1 in which the edge of the opaque radius carrier D is used as the radial line) permits of a nicer estimation of the fraction of a division of the scale when the radial line lies between two division lines of the scale. In order to estimate the fraction accurately it is necessary to see both of the division lines of the scale, and the position of the radial line between them.

There is a certain added convenience in the provision of the single scale C running in the opposite direction (that is to the left) from that of the scale H with which it registers (and which runs to the right). With such a scale, even simple operations such as $a \times b$ can be more quickly performed and an accurate result more certainly read than with devices in which both scales run in the same direction. In devices of the latter class the starting point of the movable scale is first brought into register with the first multiplier $a$ upon the fixed scale. The operator then finds on the movable scale the second multiplier $b$ and notes the number which registers with it upon the fixed scale, this number being the product. The eye has to perform the operation of finding the multiplier and the multiplicand successively whereas with the present device the eye performs these two operations simultaneously in bringing them in register with each other as previously described; and with the old type of apparatus there is a liability of error in observing the product, which is diminished with the present invention by reason of the fact that the product lies in register with the most distinctly marked line, the starting point of the scale.

What I claim is:—

1. A calculating device comprising an opaque disk A carrying a plurality of annular logarithmic scales, a transparent disk B overlying the scales on said member A and having itself a plurality of annular logarithmic scales, the scales on one disk registering with those on the other, and an opaque arm D between said disks and having a radial edge, said disks and arm being all rotatably mounted at the common center of said scales.

2. A calculating device comprising in combination a lower disk having scales, an upper transparent disk also having scales, and an arm between these two disks.

In witness whereof, I have hereunto signed my name in the presence of two subscribing witnesses.

ROBERT H. FENN.

Witnesses:
DOMINGO A. USINA,
THEODORE T. SNELL.